(12) United States Patent
Miller

(10) Patent No.: US 9,889,633 B2
(45) Date of Patent: Feb. 13, 2018

(54) ATTACHMENT METHOD FOR LAMINATE STRUCTURES

(71) Applicant: HONDA MOTOR CO., LTD, Tokyo (JP)

(72) Inventor: Ryan A. Miller, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 294 days.

(21) Appl. No.: 14/683,700

(22) Filed: Apr. 10, 2015

(65) Prior Publication Data

US 2015/0290909 A1    Oct. 15, 2015

Related U.S. Application Data

(60) Provisional application No. 61/978,128, filed on Apr. 10, 2014.

(51) Int. Cl.
*B21K 23/04*    (2006.01)
*B32B 15/01*    (2006.01)
(Continued)

(52) U.S. Cl.
CPC ............ *B32B 15/017* (2013.01); *B23K 20/02* (2013.01); *B23K 20/22* (2013.01); *B23K 20/2275* (2013.01); *B32B 3/266* (2013.01); *B32B 15/01* (2013.01); *B32B 15/011* (2013.01); *B32B 15/013* (2013.01); *B32B 15/015* (2013.01); *C22C 14/00* (2013.01)

(58) Field of Classification Search
CPC .. B23K 20/002; B23K 20/22; B23K 20/2275; B32B 15/01; B32B 15/011; B32B 15/013; C22C 14/00; Y10T 428/12361

USPC .... 428/596, 597, 582, 583, 58, 60; 148/527, 148/529, 530, 531; 156/60, 92; 52/582, 52/588
See application file for complete search history.

(56) References Cited

U.S. PATENT DOCUMENTS

| | | |
|---|---|---|
| 1,636,516 A | 8/1927 | Ware |
| 2,814,481 A | 11/1957 | Van House |
| (Continued) | | |

FOREIGN PATENT DOCUMENTS

| | | |
|---|---|---|
| CN | 10217997 A | 9/2011 |
| JP | 59-034036 A | 2/1984 |
| (Continued) | | |

OTHER PUBLICATIONS

Dwivedi et al., "Mechanical Response of Titanium Aluminide (TiAl3)," Army Research Laboratory, ARL-CR-0669 Jun. 2010, prepared by Dynamic Science, Inc., Aberdeen, MD, 23 pages.

(Continued)

*Primary Examiner* — David Sample
*Assistant Examiner* — Elizabeth Collister
(74) *Attorney, Agent, or Firm* — Arent Fox LLP

(57) ABSTRACT

The present disclosure provides a laminate structure including a laminate body with a second ply positioned between a first ply and a third ply, the second ply having an edge extending outward from a corresponding edge of the first and third plies. The laminate structure further includes a flange positioned on the edge of the second ply. The flange includes a first finger and a second finger extending outward to define a receptacle that receives the edge of the second ply therein.

22 Claims, 6 Drawing Sheets

(51) Int. Cl.
  *B23K 20/02* (2006.01)
  *B23K 20/227* (2006.01)
  *B23K 20/22* (2006.01)
  *B32B 3/26* (2006.01)
  *C22C 14/00* (2006.01)

(56) References Cited

U.S. PATENT DOCUMENTS

| | | | |
|---|---|---|---|
| 2,965,530 | A | 12/1960 | Stamm et al. |
| 3,110,369 | A | 11/1963 | Ruzicka |
| 3,204,944 | A | 9/1965 | Brownyer |
| 3,323,797 | A | 6/1967 | Horton, Jr. |
| 4,043,498 | A | 8/1977 | Conn, Jr. |
| 4,197,360 | A | 4/1980 | Throop |
| 4,364,300 | A | 12/1982 | Pagano et al. |
| 4,489,123 | A | 12/1984 | Schijve et al. |
| 5,322,740 | A | 6/1994 | Ghosh |
| 5,429,879 | A | 7/1995 | Syn et al. |
| 5,543,187 | A | 8/1996 | Errico et al. |
| 5,685,525 | A | 11/1997 | Oguri et al. |
| 5,720,319 | A * | 2/1998 | Smith ............... F01N 13/082 138/109 |
| 6,565,942 | B2 | 5/2003 | Anderson et al. |
| 6,679,487 | B2 | 1/2004 | Meatto et al. |
| 7,621,435 | B2 | 11/2009 | Vecchio et al. |
| 7,624,910 | B2 | 12/2009 | Barnes et al. |
| 7,963,204 | B2 | 6/2011 | Venton-Walters et al. |
| 8,110,054 | B2 | 2/2012 | Litzenberger et al. |
| 8,381,631 | B2 | 2/2013 | Chu et al. |
| 8,397,976 | B2 | 3/2013 | Abramovici et al. |
| 2008/0286600 | A1 * | 11/2008 | Vecchio ............... B23K 20/023 228/101 |
| 2010/0297463 | A1 | 11/2010 | Hoffstaedter et al. |
| 2011/0031350 | A1 * | 2/2011 | Sayilgan ............... B29C 70/885 244/131 |
| 2013/0028659 | A1 | 1/2013 | Leitner et al. |
| 2013/0049273 | A1 | 2/2013 | Shigematsu et al. |
| 2013/0075526 | A1 * | 3/2013 | Griess ............... B32B 5/26 244/123.1 |

FOREIGN PATENT DOCUMENTS

| | | |
|---|---|---|
| JP | S63225738 A | 9/1988 |
| JP | 2004063304 A | 2/2004 |
| WO | 2013053744 A1 | 4/2013 |

OTHER PUBLICATIONS

Sano et al., "Microstructural and Mechanical Behavior Characterization of Ultrasonically Consolidated Titanium-Aluminum Laminates," Army Researach Laboratory, ARL-RP-239 Feb. 2009, 12 pages.

Aleksandra M. Vinogradov et al., "Structure-material relations in the buckling problem of asymmetric composite columns", International Journal of Nonlinear Mechanics 35, pp. 167-175, 2000.

F. Sassani et al., "Friction Welding of Incompatible Materials", Welding Research Supplement, pp. 264s-270-s, Nov. 1988.

* cited by examiner

ATTACHMENT METHOD FOR LAMINATE STRUCTURES

CROSS-REFERENCE TO RELATED APPLICATIONS

This application is based on, claims the benefit of, and incorporates herein by reference U.S. Provisional Application Ser. No. 61/978,128 filed on Apr. 10, 2014.

STATEMENT REGARDING FEDERALLY SPONSORED RESEARCH

Not applicable.

BACKGROUND OF THE INVENTION

The disclosure relates, in general, to methods for joining incompatible materials, and more particularly to a system and method for enabling laminates to be welded to traditional materials such as steel.

Welding is a process in which two or more work pieces are joined by transforming at least one of the work pieces and, optionally, a filler material into a molten state to provide a weld pool. The weld pool is then cooled to form a strong bond or joint between the work pieces. In one aspect, this joining process can additionally involve heat, pressure or a combination thereof. Examples of materials that can be joined through welding include metals such as steel, aluminum, copper, and titanium, as well as thermoplastics such as acrylic, Nylon, PVC and Teflon.

Weldability refers to the ease or difficulty of welding a given set of work pieces with a certain process and a specified procedure to obtain acceptable welds. One definition of weldability according to the American Welding Society is, "the capacity of a material to be welded under the imposed fabrication conditions into a specific, suitably designed structure, and to perform satisfactorily in the intended service." In general, if the procedure is simple, the material can be considered easily weldable. If special precautions, such as preheating, specified heat input, controlled cooling, and postheating are required, the material generally is considered not so easily weldable.

While certain combinations of materials can be joined relatively easily via welding, other material combinations can prove to be more difficult. Generally, challenges may arise if the combined metallurgy of each of the original materials prevents the production of sound joints. Unsound joints result from differences in melting temperatures, lack of appreciable solubility of either metal in the other in the solid state, and formation of brittle intermetallic compounds. In addition, stresses can develop in the weld joint due to differences in thermal expansion coefficients, thermal conductivities, and specific heats of the materials.

In one example, welding of either titanium or aluminum with other metals such as steel can be difficult due to issues such as embrittlement caused by the formation of intermetallic phases. Attempts to weld such materials without the use of specialized techniques generally results in welds of limited ductility. Table 1 provides data as reported by Sassani et al., for friction welding of combinations of materials (Sassani et al., 1988. Welding Journal 67(11): 264-s to 270-s). In the particular case of steel and titanium, the low solubility of iron in alpha titanium at room temperature results in a weld wherein the resulting intermetallic phases (i.e., TiFe and $TiFe_2$) are very hard and brittle, thereby preventing the production of functional welds.

TABLE 1

(Sassani et al.)

| Material Combination | Type of Weld Formed |
| --- | --- |
| Aluminum alloys/magnesium alloys | No weld |
| Brass/copper | No weld |
| Bronze/plain carbon steel | No weld |
| Bronze/steel alloy | No weld |
| Magnesium alloys/magnesium alloys | No weld |
| Magnesium alloys/stainless steel | No weld |
| Nickel/titanium | No weld |
| Niobium/stainless steel | No weld |
| Niobium/zirconium alloys | No weld |
| Silver/titanium | No weld |
| Plain carbon steel/titanium | No weld |
| Plain carbon steel/tungsten carbide, cemented | Brittle weld |
| Stainless steel/titanium | Brittle weld |
| Stainless steel/zirconium alloy | Brittle weld |

Issues with forming suitable welds between work pieces or material can also arise for laminates. Laminate structures are created by stacking layers of different material in a variety of configurations followed by the application of heat and pressure to react or otherwise bond the layers together. A reliance on laminates for a particular project may be useful as these materials generally have the advantage of being both strong and light weight. Although there is a variety of material combinations used in the formation of laminates, oftentimes the resulting laminate structure cannot be directly welded to traditional steel. As a result, it may be difficult to incorporate laminates into structures of which the majority of the structural components are steel. While current methods of incorporating laminates require adhesive bonding or mechanical fastening (e.g., bolting, riveting, and the like), it may be useful to identify methods by which laminates could be welded to steel and other materials. However, more specialized techniques are required to use a welding technique to bond two or more incompatible materials.

In one aspect, techniques have been developed to isolate the incompatible materials from one another during the welding process. The two most common methods of facilitating welding and, in particular, arc welding of materials such as laminates, aluminum and, steel include the use of bimetallic transition inserts and the coating of the dissimilar material prior to welding.

Bimetallic transition materials are generally sections of material that comprise one material that has been bonded to another. Instead of arc welding, methods used for bonding the incompatible materials together can include rolling, explosion welding, friction welding, flash welding and hot pressure welding. The bimetallic transition materials can then be used as inserts to bridge two incompatible materials in normal arc welding procedures. For example, for an aluminum-steel bimetallic transition material insert, one side of the insert is welded steel-to-steel and the other aluminum-to-aluminum. One drawback is that care must be taken to avoid overheating of the insert during welding, which can result in undesirable brittle intermetallic compounds at the interface of the transition insert. Moreover, the selection of a transition insert is further complicated when one of the work pieces to be welded is a heterogeneous laminate.

In another aspect, a coating can be applied to the first material (e.g., steel) to facilitate arc welding to a second material (e.g., aluminum). One method is to coat the first material with the second material using a techniques such as dip coating (e.g., hot dip aluminizing), or brazing. Thereafter, the coated first material can be welded to the second material. However, this process also has a number of drawbacks as certain precautions must still be taken during the welding process. In particular, the second (uncoated) material should be used to form the weld pool. Alternatively, the first material can be coated with a third material that is compatible with the second material. For example, a steel surface can be coated with silver solder for welding to aluminum using aluminum filler alloy. Nevertheless, coating type joint methods are usually used for sealing purposes only and are generally not applicable when is desirable to achieve a full mechanical strength joint.

Given the aforementioned disadvantages of currently available methods for joining incompatible materials, there is a need for a system and method for enabling the welding of such incompatible materials and, in particular, the welding of laminates with traditional materials such as steel.

SUMMARY OF THE INVENTION

The present disclosure overcomes the aforementioned drawbacks by providing a laminates structure with a laminate body and a flanged end piece. In one example, a steel edge is incorporated into a laminate structure by layering steel within the structure, but only on the edge. The steel layers will bond to each other and the other material within the laminate will be imbedded within the steel edge. This allows for retention of strength and weight savings provided by the laminate while creating the ability to directly attach the structure to any other steel part using traditional methods such as welding.

In accordance with one aspect of the present disclosure, a laminate structure includes a laminate body having a second ply positioned between a first ply and a third ply, the second ply having an edge extending outward from a corresponding edge of the first and third plies. The laminate structure further includes a flange positioned on the edge of the second ply and having a first finger and a second finger extending outward to define a receptacle that receives the edge of the second ply therein.

In another aspect of the present disclosure, a laminate structure includes a flange having a first projection extending outward from the flange and having at least one hole formed therethrough. The laminates structure further includes a laminate body having a second ply positioned between a first ply and a third ply, the second ply having an edge extending inward from a corresponding edge of the first and third plies, the laminate body configured to receive the first projection in the flange. The first ply is connected to the third ply through the hole in the projection.

In still another aspect of the present disclosure, a method of making a laminate structure includes the steps of providing a laminate body having a second ply positioned between a first ply and a third ply, the second ply having an edge extending outward from a corresponding edge of the first and third plies, providing a flange positioned on the edge of the second ply and having a first finger and a second finger extending outward to define a receptacle that receives the edge of the second ply therein, assembling the steel flange with the laminate body to form a laminate structure, and compressing the laminate structure.

The foregoing and other aspects and advantages of the disclosure will appear from the following description. In the description, reference is made to the accompanying drawings which form a part hereof, and in which there is shown by way of illustration a preferred embodiment of the disclosure. Such embodiment does not necessarily represent the full scope of the disclosure, however, and reference is made therefore to the claims and herein for interpreting the scope of the disclosure.

DETAILED DESCRIPTION OF THE INVENTION

Figure 1A:
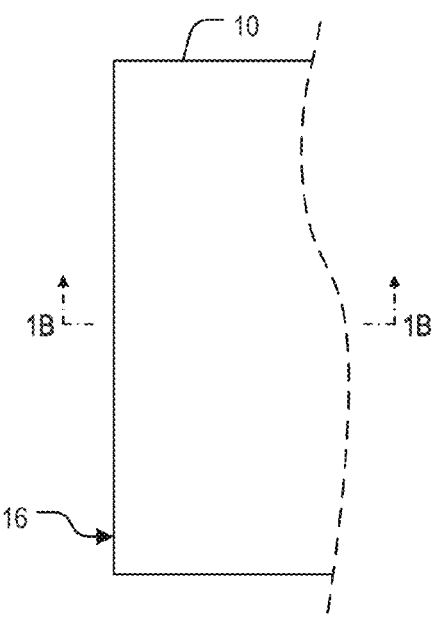
FIG. 1A is a partial plan view of an edge of an example laminate material.

The present disclosure is presented in several varying embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The described features, structures, or characteristics of the disclosure may be combined in any suitable manner in one or more embodiments. In the following description, numerous specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the disclosure.

Embodiments of the present disclosure provide a laminate structure including a laminate body and at least one flange component. With respect to the laminate body, at least two layers, sheets or plies are bonded to one another to form a stacked structure. In one aspect, each of the layers is made of the same material. However, in one embodiment, the composition of the layers may be varied. For example, at least two layers of a first material can be provided with at least one layer of a second material bonded between the layers of the first material. The laminate body materials can be selected from materials which are not readily compatible for joining to another component via welding.

In another aspect of laminate structure according to the present disclosure, at least one flange component is coupled to the laminate body to form the laminate structure. In one embodiment, the flange includes a plurality of staggered layers which can mate, overlap, or be otherwise interleaved with the layers of the laminate body during the fabrication process. The materials that make up the flange can be the same as one or more of the materials used to form the laminate body. In one aspect, the flange materials are selected from materials that are compatible for joining or welding to another component using a welding method. In one aspect, the flange materials are generally incompatible for welding to the materials that form the laminate body. Thus, in situations were it may be useful to weld a laminate body to a component that is incompatible for welding to the laminate body, a flange can be incorporated into the laminate body to form a laminate structure. The resulting laminate structure, and in particular the flange, can enable the laminate body to be welded, albeit indirectly, to another component.

In one embodiment, the flange includes one or more layers of steel and the laminate body includes alternating layers of titanium (Ti) and alloys of titanium and aluminum (Al). One suitable alloy is titanium aluminide, which is a lightweight material that is resistant to oxidation and heat, but suffers from low ductility. Several forms of titanium aluminide exist including TiAl, $Ti_3Al$, $TiAl_3$, Ti-48Al-2Nb-2Cr, and $Ti_2AlNb$. However, three of the more common intermetallic compounds are gamma TiAl, alpha 2-$Ti_3Al$ and $TiAl_3$. In one example, the laminate body includes alternating layers titanium and $Ti_3Al$.

Figure 1B:
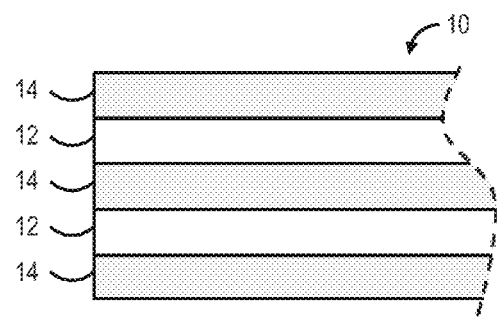
FIG. 1B is a partial cross-sectional view of the edge of the laminate material of FIG. 1A as taken along the line 1B-1B.

Referring to FIGS. 1A and 1B, an exemplary, non-limiting laminate body 10 includes two $Ti_3Al$ layers 12 and three Ti layers 14. Each $Ti_3Al$ layer 12 is bonded between two of the Ti layers 14. In this non-limiting example, the laminate body 10 includes five layers with the outer two layers being the Ti layers 14. However, it will be appreciated that any number of layers may be provided for a particular application. For traditional laminates, the layers 12, 14 are generally aligned at an edge 16 of the laminate 10 as shown in FIG. 1. Therefore, none of the layers 12, 14 extends outwards from the edge 16, but are instead shown to be flush with one another.

Figure 2A:
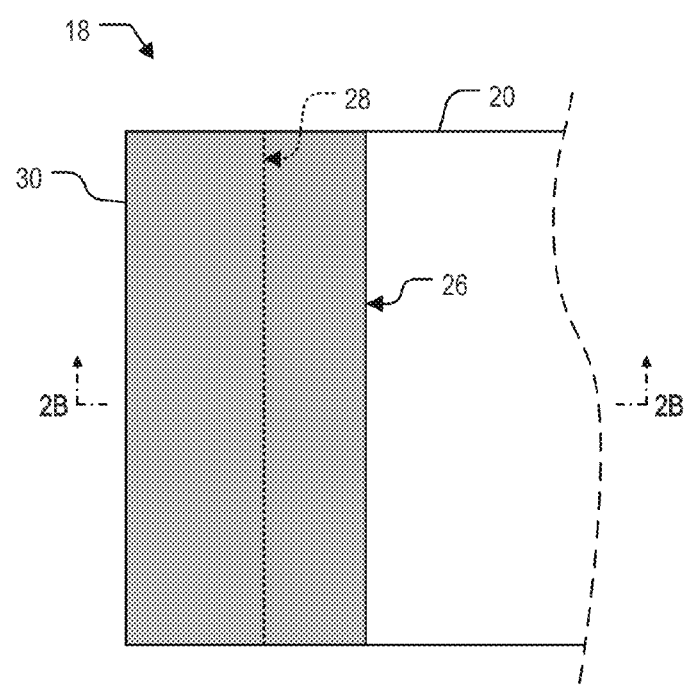
FIG. 2A is a partial plan view of an edge of a first non-limiting example of a laminate structure having a body with a flange disposed thereon according to the present disclosure.
Figure 2B:
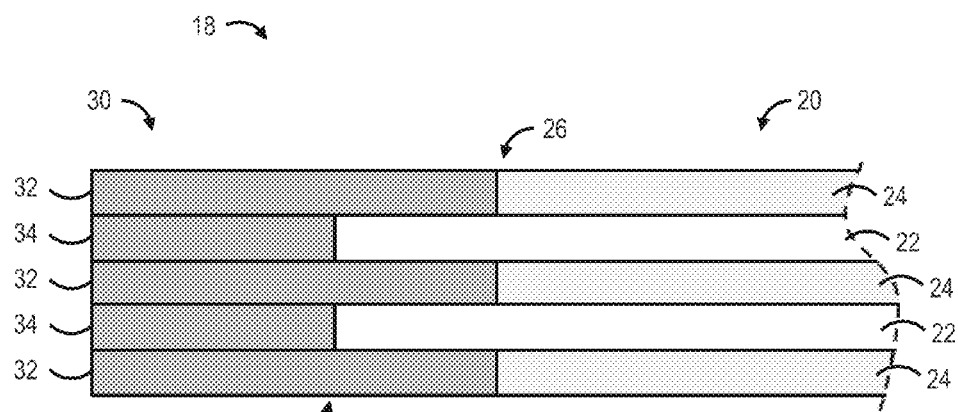
FIG. 2B is a partial cross-sectional view of the edge of the laminate structure of FIG. 2A as taken along the line 2B-2B.

Turning to FIGS. 2A and 2B, an embodiment of a laminate structure 18 according to the present disclosure includes a laminate body 20 and a flange 30. The laminate 20 includes two $Ti_3Al$ layers 22 and three Ti layers 24. Each $Ti_3Al$ layer 12 is bonded between two of the Ti layers 14, and overall, the laminate 20 includes five layers with the outer two layers being Ti layers 14. As for the laminate 10 of FIG. 1, it will be appreciated that any number of layers may be provided for a particular application of the laminate 20. Unlike the laminate 10 of FIG. 1, the edges of layers 22 are staggered with the edges of layers 24. In particular, layers 22 extend outwards from the edge 26 as defined by the ends of layers 24, of laminate body 20. In one aspect, the amount by which the edge 28 of layers 22 extends past edge 26 of layers 24 may be generally between about 1 millimeter (mm) and about 1000 mm. In other embodiments, the amount is between about 2 mm and about 100 mm, and in still other embodiments, the amount is between about 5 mm and about 20 mm.

FIGS. 2A and 2B also illustrates flange 30, which is configured to receive and couple to the laminate body 20. In one aspect, the flange 30 has a unitary construction, and in another aspect, the flange 30 is made up of a number of layers similar to the design of the laminate body. In the present example, the flange 30 has five stainless steel layers overall, including three longer layers 32 and two shorter layer 34. Each layer 34 is positioned between two of the layers 32. In a manner similar to the layers 22, 24 of laminate body 20, layers 34 are aligned with edge 28, whereas layers 32 extend past edge 28, thereby forming a channel to receive an edge of layers 22. Moreover, FIG. 2 shows that layers 32 abut layers 24, and layers 34 abut layers 22. However, it is not necessary that the each of the flange layers abuts a corresponding layer within the laminate body 20.

Figure 3:
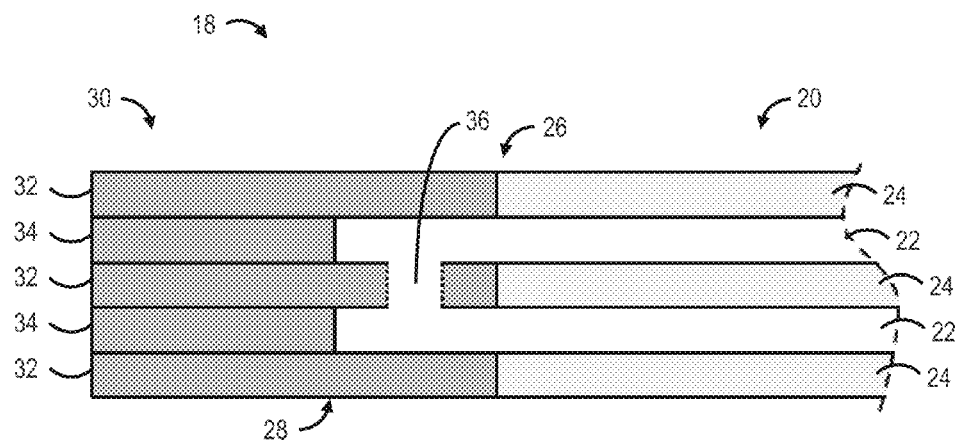
FIG. 3 is a partial cross-sectional view similar to FIG. 2B showing a second non-limiting example of an edge of a laminate structure having a body with a flange disposed thereon according to the present disclosure. In one aspect, at least one hole is formed in one of the fingers of the flange.

Referring to FIG. 3, another embodiment according to the present disclosure is shown in which a hole or passage 36 is formed within one or more of the internal layers 32 of the flange 30. The passage 36 enables internal layers 22 to pass through the passage 30 in order to contact each other. In one aspect, it can be useful for internal layers 22 to be in contact in order to form a bond between the layers 22 and to improve the structural integrity of the coupling between the flange 30 and the laminate body 20. In another aspect, the layers 22 can be made to flow, deform, or otherwise pass through passage 36 by first layering the components of the laminate structure 18 and then heating the layers of the laminate structure 18, compressing the layers of the laminate structure 18, or a combination thereof. One result of such a processing step is that the adjacent layers 22 (separated by a single layer 24) are made to contact each other through the passage 36.

Figure 4:
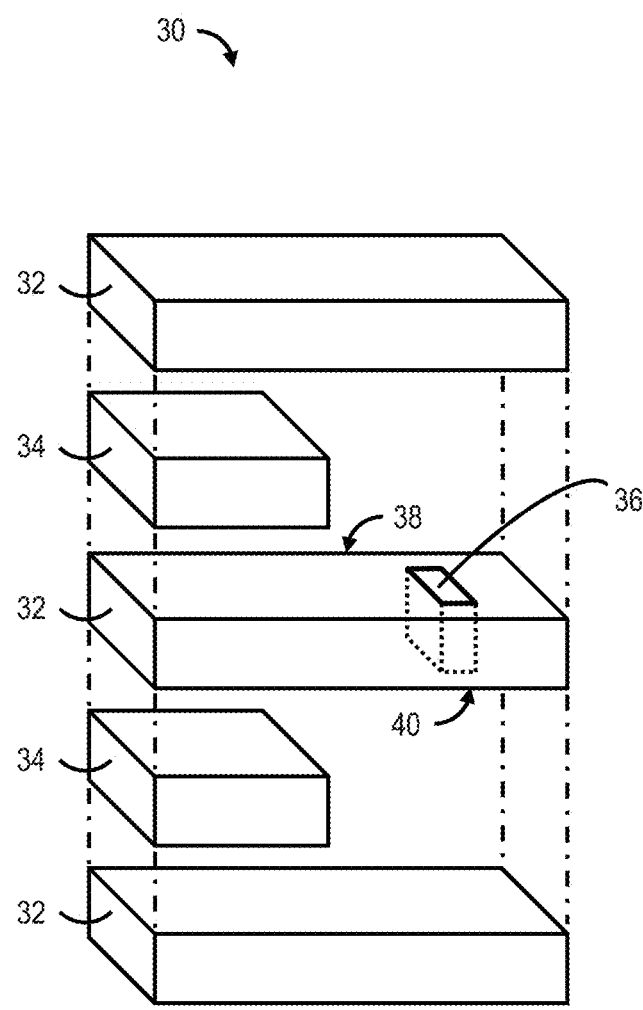
FIG. 4 is an exploded view of the flange according to FIG. 3.

Turning now to FIG. 4, the flange 30 consists of a plurality of individual layers having varying dimensions. In particular, layers 32 have a greater length dimension than the layers 34. Moreover, one of the layers 32 is shown to include a passage 36 that is characterized by a rectangular cross-section. While the present example passage 36 includes a rectangular cross-section, other cross-sectional geometries can be used in the design of a flange according to the present disclosure. Example cross-sectional geometries can include circles, squares, triangles, stars shapes, and other polygonal and curvilinear designs. Further, more than one passage 36 can be included in the layers 32, and the position of the one or more passages 36 can be spaced in any suitable manner to achieve a particular number of locations for connections between layers 22.

The passage 36 is further shown in FIG. 4 to pass through one of the layers 32 with openings in both an upper face 38 and a lower face 40 of the layer 32. However, other types of features can be supplemented or exchanged for passages 36. Examples of such features include any sort of cavity, depression, trench or other like feature formed in one of the layers 32 and the layers 34 of the flange 30. In one example, each internal face of layers 32 can have at least one depression formed thereon such that when assembled with the laminate body 20 and compressed, portions of layers 22 will flow or deform into the depressions. In this case, the layers 22 are able to comingle with layers 32 but do not come into contact with adjacent layers 22 as the depressions only extend partway into the layers 32 and do not pass entirely through the layers 32 as with passage 36 in FIGS. 3 and 4.

Figure 5:
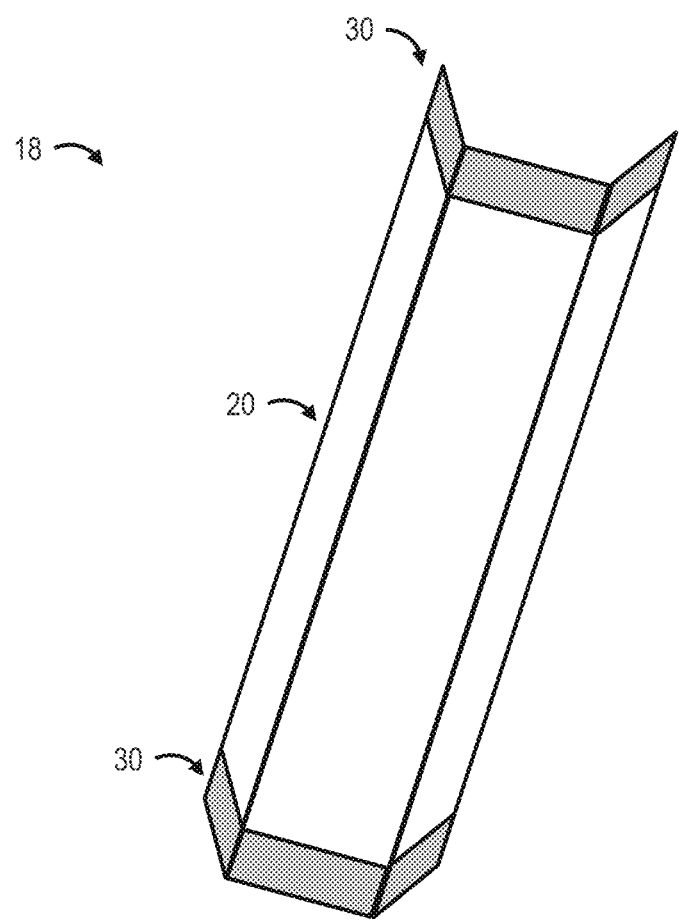
FIG. 5 is a perspective view of an example laminate structure according to the present disclosure.

With reference to FIG. 5, an example is shown of a laminate structure 18 according to the present disclosure. The laminate structure 18 includes a laminate body 20 and a pair of flanges 30 positioned on opposing ends of the laminate body 20. In one aspect, the flanges 30 can be steel flanges in order enable the laminate structure 18 to be welded onto a steel component such as a vehicle frame. In the case where the laminate body 20 comprises titanium and aluminum alloy plies, the steel flanges 30 enable the laminate body 20 to be incorporated without the use of fasteners, adhesives or other specialized joining techniques for coupling aluminum or titanium to steel. Alternatively, the laminate body 20 and the flanges 30 can comprise a variety of materials that are generally considered incompatible with each other and/or a third component as in the case of the steel vehicle frame in the previous example.

It can be seen from FIG. 5 that the laminate structure 18 is not a flat sheet, but rather has a complex shape with multiple creases and an overall three-dimensional shape. Thus, it can be appreciated that the laminate structure 18 can be formed into a variety of shapes and sizes. For example, during forming, the laminate structure 18 can be formed over a form or guide to permit the laminate to be formed into curved or segmented shapes such as a curved section. Moreover, the final shape of the laminate structure 18 can be formed during the process of assembling the layers of the laminate body and the flange. Alternatively, the shape of the laminate structure 18 can be altered at a later time. In one example, the laminate structure 18 can be bent, cut, deformed or otherwise shaped following assembly of the laminate structure 18 by using various methods known in the art for working with laminates and steel.

Figure 6:
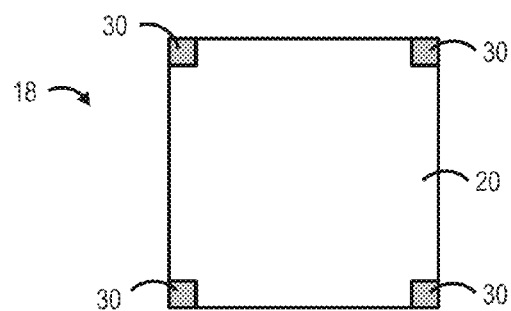
FIG. 6 is a plan view of an example laminate structure in which flanges are disposed only at the corners of the laminate body.
Figure 7:
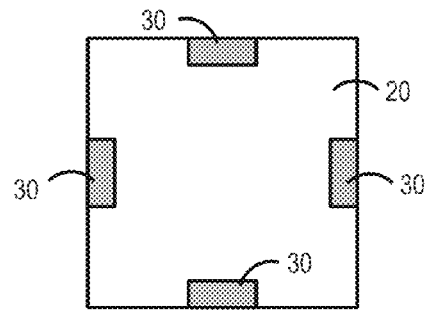
FIG. 7 is a plan view of an example laminate structure in which flanges are disposed on only a portion of the edges of the laminate body.
Figure 8:
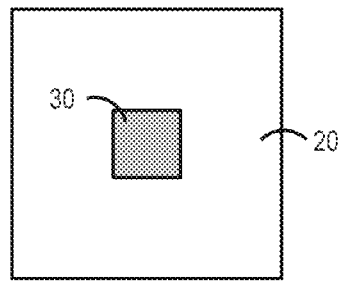
FIG. 8 is a plan view of an example laminate structure with a flange positioned interior to the laminate body.
Figure 9:
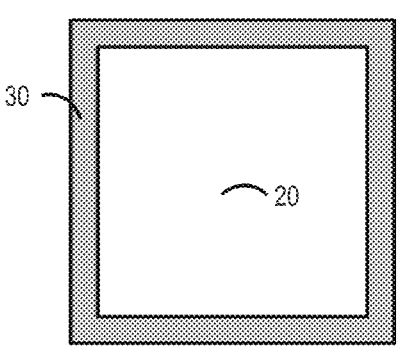
FIG. 9 is a plan view of an example laminate structure with a flange position around the entirety of the perimeter of the laminate body.
Figure 10:
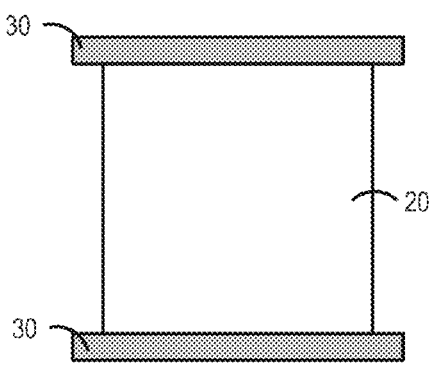
FIG. 10 is a plan view of an example laminate structure with flanges positioned on opposing edges of the laminate body such that portions of the flanges extend past the edges of the laminate body.

The laminate structure 18 of FIG. 5 is shown to include two flanges 30. However, one or more flanges can be positioned at any suitable position with respect to the laminate body. In one aspect, the laminate structure 18 can also be formed with only a single flange 30 or with multiple flanges 30 on multiple edges of the laminate body 20. In one aspect, the flange 30 can be incorporated into only a portion of an edge of the laminate body 18. For example, the generally rectangular laminate body can be formed with flange portions positioned only at the corners of the laminate body as in FIG. 6. In another aspect, flanges can be positioned at about the midpoints of the laminate body 18 such that the flanges 30 do not extend all of the way to the corners of the laminate body (FIG. 7). In yet another aspect, a flange can be incorporated at an interior location with respect to the laminate body (FIG. 8). The flanges 30 can be made to extend along the entire length of an edge of the laminate body 18 (FIG. 5), around all edges (FIG. 9), or even extend past an edge of the laminate body 18 (FIG. 10).

In one aspect, each of the layers of the laminate structure 18 can have the same thickness dimension, whereas in another aspect, corresponding layers can have varying thickness dimensions. If the thicknesses of each of the layers are allowed to vary, corresponding layers can have the same thickness in order to ensure uniformity between the flange 30 and laminate body 20. For example, an outer layer 32 and a corresponding outer layer 24 can each have a first thickness dimension, while an adjacent layer 34 and corresponding layer 22 can each have a second thickness dimension different from the first thickness dimension. In one embodiment, the layers are between about 0.125 mm (about 0.005 inches) and about 2.5 mm (about 0.1 inches) thick. Other thickness foil layers may also be used, such as between about 0.04 mm (about 0.015 inches) to about 2 mm (about 0.08 inches).

Whereas one example embodiment of a laminate structure includes layers of Ti and Al foils, other embodiments can includes other types of metallic foils such as nickel (Ni), iron (Fe), NiAl, FeAl and the like. According to another embodiment, the laminate includes fiber layers and optionally, a resin matrix that holds polymer fibers. The resin matrix can be a thermo hardening material permitting heat cure of the laminate.

According to one method of the present disclosure, the layers of the laminate are bonded to each other during assembly of the laminate. The layers of the first material can suitably bond themselves to the layers of the second (third, fourth, and so on) material when the laminate is assembled and exposed to heat, held under pressure, or a combination thereof. However, in some embodiments, it may be useful to enhanced bond strengths between the layers. In one example, the bond is enhanced by pre-treatment of one or more of the layers with an adhesive disposed between the layers. Moreover, the layers of the laminate can be bonded together by methods known in the art, such as explosive welding, hot isostatic pressing (HIP), diffusion bonding, roll-bonding, or a combination thereof.

In some embodiments, the metallic layers themselves can be pre-treated to improve characteristics such as adhesion, strength, and durability of the laminate. Pre-treatments may include a wide variety of metallic pre-treatments including acid or alkaline etching, conversion coatings, phosphoric acid anodizing, and the like. Such pre-treatments can increase surface roughness, thereby facilitating a stronger physical or chemical bond with an adhesive, for example. In another embodiment, a further alternate pre-treatment of applying a sol-gel coating to the layers can be utilized prior to assembly of the laminate. The sol-gel process commonly uses inorganic or organometallic precursors to form an inorganic polymer sol. The resulting inorganic polymer sol coating serves as an interphase layer between the layers when they are bonded together. Pre-treatments may also include grit blasting. Grit blasting may also be applied to cold work alloys, if present, in the metallic layers. Further example pre-treatments may include heat treatments and wet honing.

Figure 11:
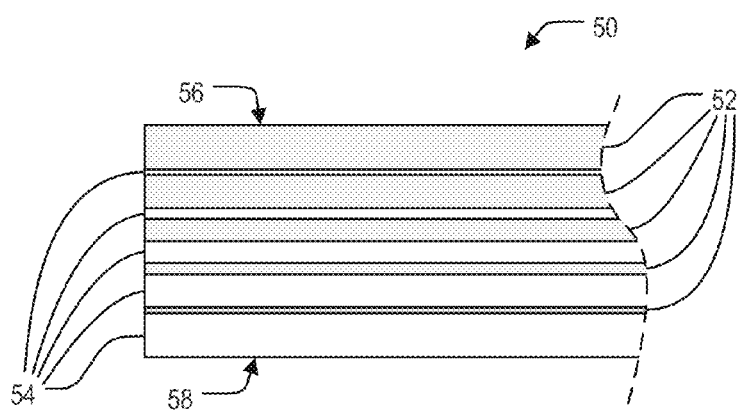
FIG. 11 is a partial cross-sectional view similar to FIG. 2B showing a third non-limiting example of an edge of a laminate structure according to the present disclosure.
Figure 12:
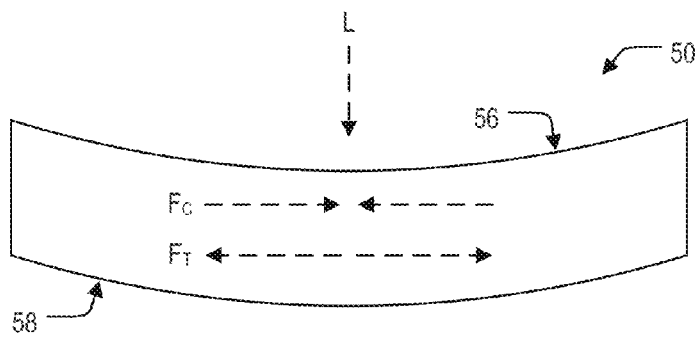
FIG. 12 is a schematic illustration of an elevational view of the edge of the laminate structure of FIG. 11 showing the behavior of the laminate upon application of a load to a face of the body of the laminate structure.

Turning now to FIGS. 11 and 12, another embodiment of a laminate structure 50 can include a first set of plies or layers 52 and a second set of plies or layers 54. In one aspect, each of the layers 52 and the layers 54 can vary in a thickness dimension. For example, the example laminate structure 50 is formed in an asymmetric manner with the layers 52 and the layers 54 having different material properties. When a load (L) is applied to a first face 56 of the laminate structure 50, the portion of the first face 56 where the load (L) is incident experiences compression forces ($F_C$), while a second face 58 of the laminate structure 50 opposing the first face 56 experiences tension forces ($F_T$). In one aspect, each of the load (L) the compression forces ($F_C$) and the tension forces ($F_T$) are indicated by corresponding dashed lines in FIG. 13.

In the case of a homogenous single layer or laminate material, the weakest aspect of the physical and mechanical properties (e.g., response to compressive vs. tensile forces) can lead to failure of the material. However, in the case of the laminate structure 50, the layers 52 can be selected to have different material properties from the layers 54. By arranging the layers 52 with relatively stronger compressive properties (as compared with the layers 54) toward the impact (load receiving) face (e.g., the first face 56) of the laminate structure 50, and the layers 54 with relatively stronger tensile properties (as compared with the layers 52) toward the opposing second face 58, an improved material can be created as compared with a homogenous single layer or homogenous laminate material having the same overall thickness (i.e., in the direction extending between the first face 56 and the second face 58).

In some embodiments, the layers 52 can have a thickness dimension that is relatively greater towards the first face 56 and the layers 54 can have a thickness dimension that is relatively greater toward the opposing second face 58 of the laminate structure 50 as shown, for example, in FIG. 11. In one aspect, an exterior one of the layers 52 at the first face 56 of the laminate structure 50 can be relatively thicker than a juxtaposed or subjacent one of the layers 54. In another aspect, an exterior one of the layers 54 at the second face 58 of the laminate structure 50 can be relatively thicker than a juxtaposed or subjacent one of the layers 52. In yet another aspect the thickness of the layers 52, the layers 54, or a combination thereof can decrease in a thickness direction of the laminate. For example, the layers 52 may reduce in size sequentially from the one of the layers 52 closest to the first face 56 to the one of the layers 52 closest to the second face 58.

Figure 13:
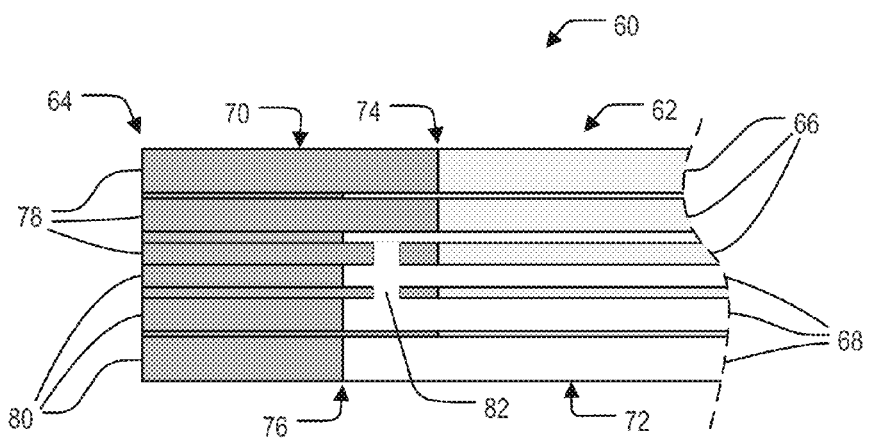
FIG. 13 is a partial cross-sectional view similar to FIG. 3 showing a laminate structure including an example flange according to the present disclosure disposed on a laminate body having a construction similar to the laminate structure of FIG. 11.

With reference to FIG. 13, an embodiment of a laminate structure 60 according to the present disclosure can include a laminate body 62 similar to the laminate structure 50 and a flange 64. The laminate structure 60 includes a plurality of layers 66 and layers 68. Each of the layer 66 is bonded to adjacent the layers 68, and overall, the laminate structure 60 includes ten layers with the an outer one of the layers 66 defining a portion of a first face 70 of the laminate structure 60, and an outer one of the layers 68 defining a portion of a second face 72 of the laminate structure 60. As for the laminate structure 50 of FIGS. 11 and 12, it will be appreciated that any number of layers may be provided for a particular application. Unlike the laminate structure 50 of FIG. 11, the edges of the layers 66 are staggered with the edges of layers 68. In particular, the layers 68 extend outwards from an edge 74 as defined by the ends of the layers 66 of laminate body 62. In one aspect, the amount by which an edge 76 of the layers 68 extends past the edge 74 of the layers 66 may be generally between about 1 mm and about 1000 mm. In other embodiments, the amount is between about 2 mm and about 100 mm, and in still other embodiments, the amount is between about 5 mm and about 20 mm.

FIG. 13 also illustrates the flange 64, which is configured to receive and couple to the laminate body 62. In some embodiments, the flange 64 can have a unitary construction, while in other embodiments, the flange 64 is made up of a number of layers similar to the design of the laminate body 62. In the present example, the flange 64 has 10 stainless steel layers overall, including five longer layers 78 and five shorter layer 80. Each of the layers 78 is alternated with the layers 80. In a manner similar to the layers 66 and the layers 68 of laminate body 62, the layers 80 are aligned with the edge 76, whereas the layers 78 extend past the edge 76 and to the edge 74, thereby forming a channel to receive an edge of the layers 68. Moreover, FIG. 13 shows that the layers 78 abut the layers 66, and the layers 80 abut the layers 68. However, it is not necessary that the each of the layers 78 or the layers 80 of the flange 64 abuts a corresponding one of the layers 66 or the layers 68 within the laminate body 62.

In some embodiments, a hole or passage 82 is formed within one or more of an internal one of the layers 78 or the layers 80 of the flange 64. The passage 82 can enable an internal one of the layers 68 (or the layers 66) to pass through the passage 82 in order to contact each other. In one aspect, it may be useful for the two or more of the internal layers 68 to be in contact in order to form a bond between the layers 68 and to improve the structural integrity of the coupling between the flange 64 and the laminate body 62. In another aspect, the layers 68 can be made to flow, deform, or otherwise pass through passage 82 by first layering the components of the laminate structure 62 and then heating the layers of the laminate structure 62, compressing the layers of the laminate structure 62, or a combination thereof. One result of such a processing step is that the adjacent layers 68 (separated by one or more of the layers 66) are made to contact each other through the passage 82.

In some embodiments, the flange 64 may have a construction similar to the flange 30 as shown in FIGS. 2-4. Accordingly, the example passage 82 can include a rectangular cross-section. However, other cross-sectional geometries can be used in the design of a flange according to the present disclosure. Example cross-sectional geometries can include circles, squares, triangles, stars shapes, and other polygonal and curvilinear designs. Further, more than one passage 82 can be included in the layers 78 or the layers 80, and the position of the one or more of the passages 82 can be spaced in any suitable manner to achieve a particular number of locations for connections between the layers 68.

The passages 82 are further shown in FIG. 13 to pass through one of the layers 78 with openings in both an upper face and a lower face of the one of the layers 78. However, other types of features can be supplemented or exchanged for the passages 82. Examples of such features can include any sort of cavity, depression, trench or other like feature formed in one of the layers 66, the layers 68, the layers 78, the layers 80, or a combination thereof. In one example, each internal face of the layers 78 or the layers 80 can have at least one depression formed thereon such that when assembled with the laminate body 62 and compressed, portions of layers 66 or the layers 68 will flow or deform into the depressions. In this case, the layers 66 or the layers 68 are able to comingle with the layers 78 or the layers 80 but do not come into contact with an adjacent one of the layers 66 or the layers 68 as the depressions only extend partway into the layers 78 or the layers 80 and do not pass entirely through the layers 78 or the layers 80 as with passage 82 in FIG. 13.

The present disclosure has been described in terms of one or more preferred embodiments, and it should be appreciated that many equivalents, alternatives, variations, and modifications, aside from those expressly stated, are possible and within the scope of the disclosure.

Each reference identified in the present application is herein incorporated by reference in its entirety.

While present inventive concepts have been described with reference to particular embodiments, those of ordinary skill in the art will appreciate that various substitutions and/or other alterations may be made to the embodiments without departing from the spirit of present inventive concepts. Accordingly, the foregoing description is meant to be exemplary, and does not limit the scope of present inventive concepts.

A number of examples have been described herein. Nevertheless, it should be understood that various modifications may be made. For example, suitable results may be achieved if the described techniques are performed in a different order and/or if components in a described system are combined in a different manner and/or replaced or supplemented by other components or their equivalents. Accordingly, other implementations are within the scope of the present inventive concepts.

What is claimed is:

1. A laminate structure comprising:
    a laminate body comprising a second ply positioned between a first ply and a third ply, the second ply having an edge extending outward from a corresponding edge of the first and third plies; and
    a flange positioned on the edge of the second ply and having a first finger and a second finger extending outward to define a receptacle that receives the edge of the second ply therein,
    wherein the flange comprises steel and the first and third plies comprise titanium.

2. The laminate structure of claim 1, wherein the second ply comprises aluminum.

3. The laminate structure of claim 1, wherein the flange is a laminate formed of a plurality of plies.

4. The laminate structure of claim 1, wherein the width of the flange is less than about 100 millimeters.

5. The laminate structure of claim 1, wherein the at least one of the first and second fingers comprise at least one hole formed therethrough.

6. The laminate structure of claim 5, further comprising a fourth ply, wherein the first ply is positioned between the second and fourth plies, and wherein the second and fourth plies are in contact through the at least one hole.

7. A laminate structure comprising:
    a laminate body comprising a second ply positioned between a first ply and a third ply,
    the second ply having an edge extending outward from a corresponding edge of the first and third plies; and
    a flange positioned on the edge of the second ply and having a first finger and a second finger extending outward to define a receptacle that receives the edge of the second ply therein,
    wherein the flange comprises steel, and
    wherein the laminate body comprises a first set of plies alternately layered with a second set of plies having a composition different from that of the first set of plies, and wherein at least one of the first set of plies and the second set of plies has a thickness dimension that decreases in a thickness direction of the laminate body.

8. The laminate structure of claim 7, wherein the second ply comprises aluminum.

9. The laminate structure of claim 7, wherein the flange is a laminate formed of a plurality of plies.

10. The laminate structure of claim 7, wherein the width of the flange is less than about 100 millimeters.

11. The laminate structure of claim 7, wherein the at least one of the first and second fingers comprise at least one hole formed therethrough.

12. The laminate structure of claim 11, further comprising a fourth ply, wherein the first ply is positioned between the second and fourth plies, and wherein the second and fourth plies are in contact through the at least one hole.

13. A laminate structure comprising:
    a flange having a first projection extending outward from the flange and having at least one hole formed therethrough; and a laminate body comprising a second ply positioned between a first ply and a third ply, the second ply having an edge extending inward from a corresponding edge of the first and third plies, the laminate body configured to receive the first projection in the flange, wherein the first ply is connected to the third ply through the hole in the projection, wherein the first and third plies comprise titanium, and
    wherein the second ply comprises aluminum.

14. The laminate structure of claim 13, wherein the flange comprises a steel flange.

15. The laminate structure of claim 13, wherein the flange is a laminate formed of a plurality of plies.

16. The laminate structure of claim 13, wherein the width of the flange is less than about 100 millimeters.

17. A method of making the laminate structure of claim 1, comprising: providing a laminate body comprising a second ply positioned between a first ply and a third ply, the second ply having an edge extending outward from a corresponding edge of the first and third plies; providing a flange positioned on the edge of the second ply and having a first finger and a second finger extending outward to define a receptacle that receives the edge of the second ply therein; assembling the steel flange with the laminate body to form a laminate structure; and compressing the laminate structure.

18. The method of claim 17, wherein the flange is a laminate formed of a plurality of plies.

19. The method of claim 17, wherein the at least one of the first and second fingers comprise at least one hole formed therethrough.

20. The method of claim 19, the laminate structure further comprising a fourth ply, wherein the first ply is positioned between the second and fourth plies, and wherein the second and fourth plies are in contact through the at least one hole.

21. The method of claim 20, wherein the step of compressing the laminate structure further comprises flowing the at least one of the second and fourth plies into the at least one hole in the flange to connect the second and fourth plies.

22. The method of claim 17, wherein the laminate body comprises a first set of plies alternately layered with a second set of plies having a composition different from that of the first set of plies, and wherein at least one of the first set of plies and the second set of plies has a thickness dimension that decreases in a thickness direction of the laminate body.

* * * * *